US011062259B2

(12) United States Patent
Smith et al.

(10) Patent No.: US 11,062,259 B2
(45) Date of Patent: Jul. 13, 2021

(54) SYSTEMS AND METHODS FOR MONITORING DELIVERY COMPLIANCE TIMES OF ONLINE ORDERS

(71) Applicant: WAL-MART STORES, INC., Bentonville, AR (US)

(72) Inventors: Austin Lee Smith, Burlingame, CA (US); Vidyanand Krishnan, Sunnyvale, CA (US); Michael Gilbert Ebener, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 177 days.

(21) Appl. No.: 15/698,363

(22) Filed: Sep. 7, 2017

(65) Prior Publication Data

US 2019/0073626 A1    Mar. 7, 2019

(51) Int. Cl.
*G06Q 30/00* (2012.01)
*G06Q 10/08* (2012.01)
*G06Q 10/06* (2012.01)
*G06Q 30/06* (2012.01)

(52) U.S. Cl.
CPC ..... *G06Q 10/087* (2013.01); *G06Q 10/06316* (2013.01); *G06Q 10/08355* (2013.01); *G06Q 30/0633* (2013.01); *G06Q 30/0641* (2013.01)

(58) Field of Classification Search
None
See application file for complete search history.

(56) References Cited

U.S. PATENT DOCUMENTS

| 2007/0095905 | A1* | 5/2007 | Kadaba | G06K 19/0717 235/384 |
|---|---|---|---|---|
| 2013/0103605 | A1* | 4/2013 | Villegas | G06Q 10/06 705/332 |
| 2016/0292634 | A1 | 10/2016 | Mehring et al. | |
| 2016/0328669 | A1 | 11/2016 | Droege | |
| 2018/0196401 | A1* | 7/2018 | Lagares-Greenblatt | G05B 19/048 |

OTHER PUBLICATIONS

Hsu, Chaug-Ing, Vehicle Routing Problem with Time-Windows for Perishable Food Delivery, May 2007, Journal of Food Engineering, vol. 80, Issue 2, pp. 465-475 (Year: 2007).*

* cited by examiner

*Primary Examiner* — Jeffrey A. Smith
*Assistant Examiner* — Timothy J Kang
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of receiving an order from a customer for a delivery of grocery items to a fulfillment location, determining a delivery compliance time for at least one item of the grocery items, receiving a pickup notification indicating that a pickup has picked up the grocery items at a first time, determining, at a second time after the first time, if a duration of time between the first time and the second time is greater than the delivery compliance time, and, if the duration of time between the first time and the second time is greater than the delivery compliance time, coordinating displaying an expiration message on a pickup interface of a pickup electronic device of the pickup.

20 Claims, 5 Drawing Sheets

400

| 405 – Receiving an order from a customer for a delivery of one or more grocery items to a fulfillment location. |

| 410 – Determining a delivery compliance time for at least one item of the one or more grocery items. |

| 415 – Receiving a pickup notification indicating that the at least one item has been removed from the temperature-controlled environment at a store at a first time for a pickup to pick up the one or more grocery items from the store and deliver the one or more grocery items to the delivery location.. |

| 420 – Determining, at a second time after the first time, if a duration of time between the first time and the second time is greater than the delivery compliance time for the at least one item of the one or more grocery items. |

| 425 – If the duration of time between the first time and the second time is greater than the delivery compliance time for the at least one item of the one or more grocery items, coordinating displaying an expiration message on a pickup interface of a pickup electronic device of the pickup. |

FIG. 4

SYSTEMS AND METHODS FOR MONITORING DELIVERY COMPLIANCE TIMES OF ONLINE ORDERS

TECHNICAL FIELD

This disclosure relates generally to monitoring delivery compliance times of one or more products in an online order.

BACKGROUND

Many customers of retail or grocery stores now desire the convenience of having their orders delivered to their homes and/or picking up their already-collected orders at a designated area of the store. These orders are often made online by the customers using a website or mobile application for the store. Because refrigerated delivery trucks are expensive to operate, many grocery stores now deliver orders with frozen and/or refrigerated items in non-refrigerated vehicles. With delivery of grocery items, however, there is a risk that refrigerated and/or frozen items can expire during delivery due to the refrigerated and/or frozen items being outside of a temperature-controlled environment for an excessive amount of time.

BRIEF DESCRIPTION OF THE DRAWINGS

To facilitate further description of the embodiments, the following drawings are provided in which:

FIG. 4 is a flowchart for a method, according to certain embodiments; and

Figure 1:
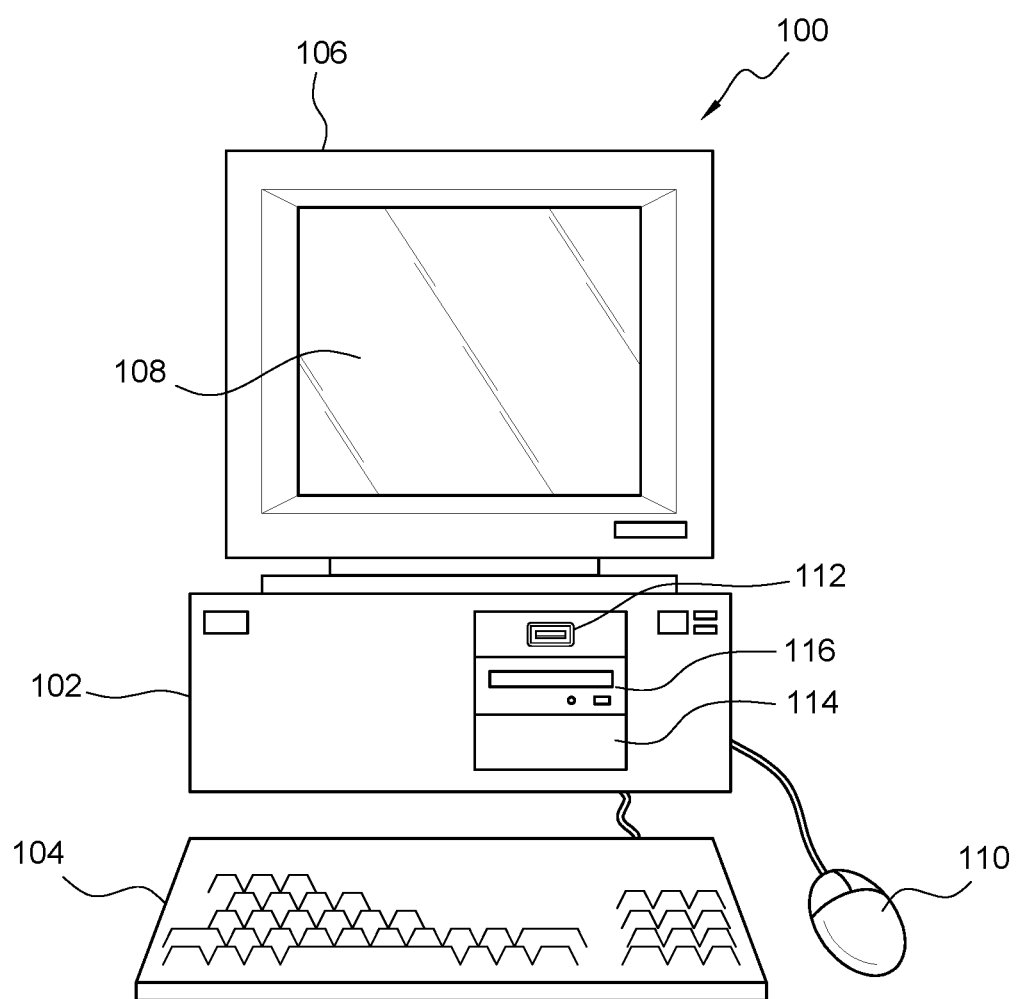
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of receiving an order from a customer electronic device of a customer for a delivery of one or more grocery items to a fulfillment location. The fulfillment location can comprise a delivery location requested by the customer. The one or more storage modules can be further configured to run on the one or more processing modules and perform an act of determining a delivery compliance time for at least one item of the one or more grocery items. If the at least one item is outside of a temperature-controlled environment for a period of time that is greater than the delivery compliance time for the at least one item, then the at least one item expires. The one or more storage modules can be further configured to run on the one or more processing modules and perform an act of receiving a pickup notification indicating that the at least one item of the one or more grocery items has been removed from the temperature-controlled environment at a store at a first time for a pickup to pick up the one or more grocery items from the store and deliver the one or more grocery items to the delivery location requested by the customer. The one or more storage modules can be further configured to run on the one or more processing modules and perform an act of determining, at a second time after the first time, if a duration of time between the first time and the second time is greater than the delivery compliance time for the at least one item of the one or more grocery items. The one or more storage modules can be further configured to run on the one or more processing modules and perform an act of, if the duration of time between the first time and the second time is greater than the delivery compliance time for the at least one item of the one or more grocery items, coordinating displaying an expiration message on a pickup interface of a pickup electronic device of the pickup.

Various embodiments include a method. The method can include receiving an order from a customer electronic device of a customer for a delivery of one or more grocery items to a fulfillment location. The fulfillment location can comprise a delivery location requested by the customer. The method also can include determining a delivery compliance time for at least one item of the one or more grocery items. If the at least one item is outside of a temperature-controlled environment for a period of time that is greater than the delivery compliance time for the at least one item, then the at least one item expires. The method also can include receiving a pickup notification indicating that the at least one item of the one or more grocery items has been removed from the temperature-controlled environment at a store at a first time for a pickup to pick up the one or more grocery items from the store and deliver the one or more grocery items to the delivery location requested by the customer. The method also can include determining, at a second time after the first time, if a duration of time between the first time and the second time is greater than the delivery compliance time for the at least one item of the one or more grocery items. The method also can include, if the duration of time between the first time and the second time is greater than the delivery compliance time for the at least one item of the one or more grocery items, coordinating displaying an expiration message on a pickup interface of a pickup electronic device of the pickup.

Figure 2:
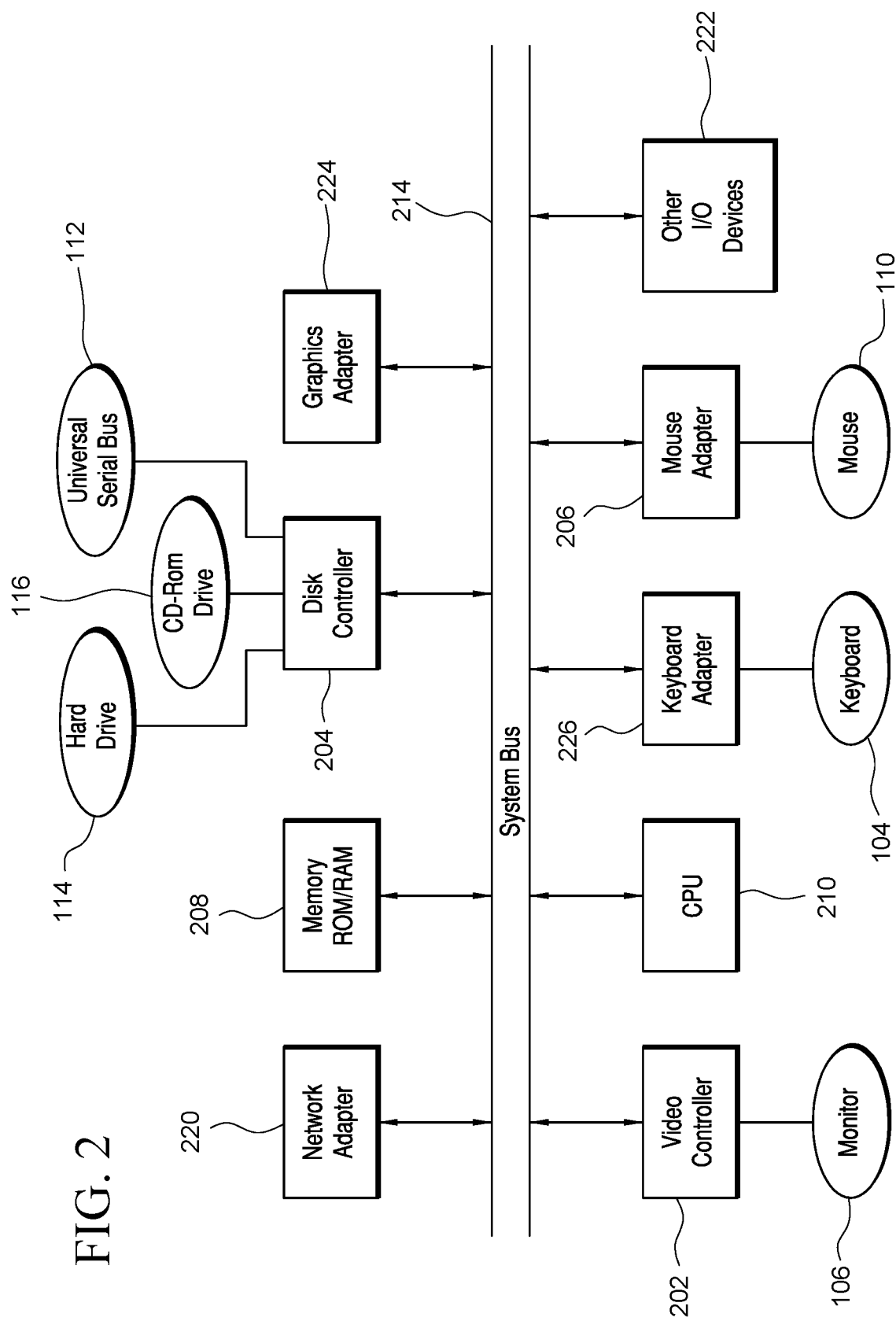
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module (s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
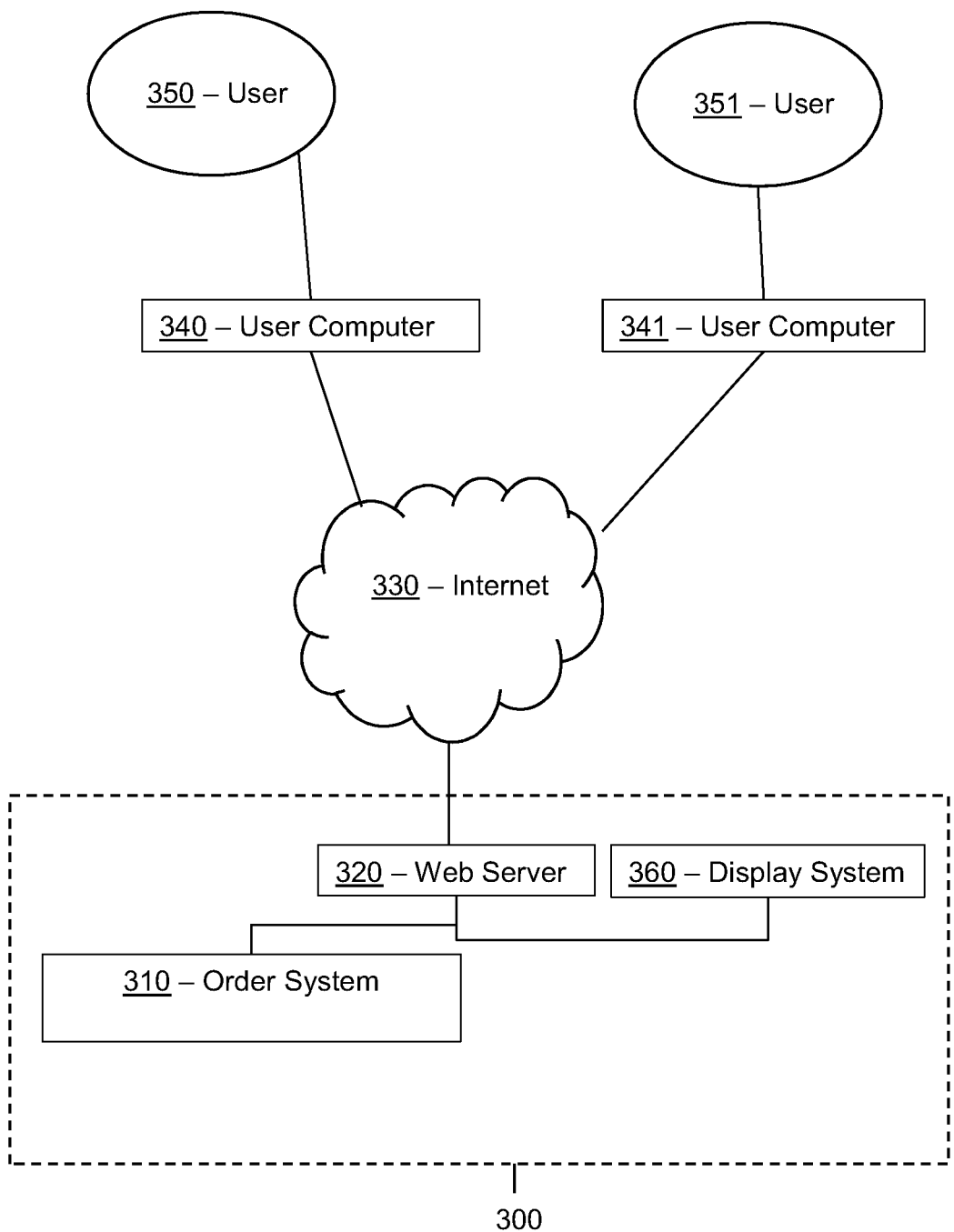
FIG. 3 illustrates a representative block diagram of a system, according to an embodiment.

Turning ahead in the drawings, FIG. 3 illustrates a block diagram of a system 300 that can be employed for monitoring delivery compliance times of online orders, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an order system 310, a web server 320, and a display system 360. Order system 310, web server 320, and display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of order system 310, web server 320, and/or display system 360. Additional details regarding parameter order system 310, web server 320, and display system 360 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, and/or to purchase products, in addition to other suitable activities.

In many embodiments, order system 310, web server 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) order system 310, web server 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of order system 310, web server 320, and/or display system 360. In a similar manner, the processing module(s) and the memory storage module(s) can be local and/or remote to each other.

In many embodiments, order system 310, web server 320, and/or display system 360 can be configured to communicate with one or more user computers 340 and 341. In some embodiments, user computers 340 and 341 also can be referred to as customer computers. In some embodiments, order system 310, web server 320, and/or display system 360 can communicate or interface (e.g., interact) with one or more customer computers (such as user computers 340 and 341) through a network or internet 330. Internet 330 can be an intranet that is not open to the public. Accordingly, in many embodiments, order system 310, web server 320, and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, order system 310, web server 320, and/or display system 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between order system 310, web server 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
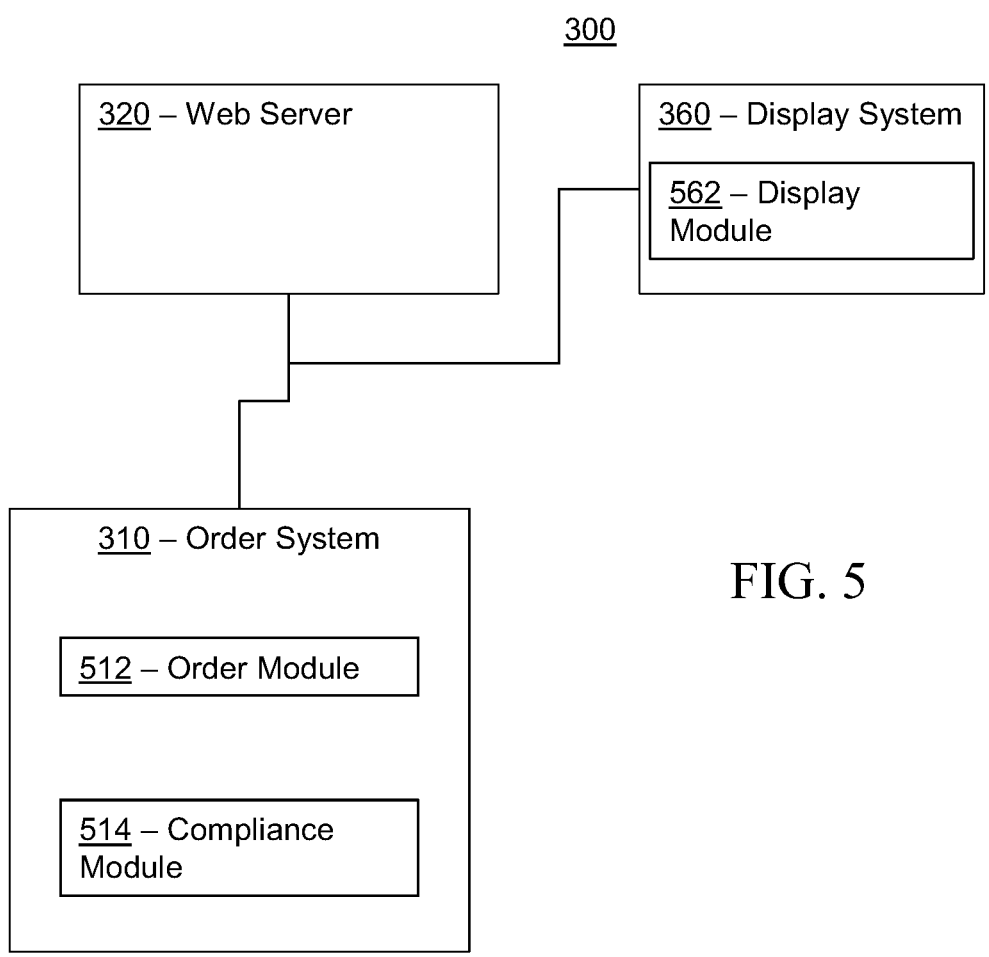
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 514, and/or 562 (FIG. 5). Such non-transitory memory storage modules can be part of a computer system such as order system 310, web server 320, and/or display system 360 (FIGS. 3 & 5). The processing module(s) can be similar or identical to the processing module(s) described above with respect to computer system 100 (FIG. 1).

Many customers of retail or grocery stores now desire the convenience of having their orders delivered to their homes and/or picking up their already-collected orders at a designated area of the store. These orders are often made online by the customers using a website or mobile application for the store. Because refrigerated delivery trucks are expensive to operate, many grocery stores now deliver orders with frozen and/or refrigerated items in non-refrigerated vehicles. With delivery of grocery items, however, there is a risk that refrigerated and/or frozen items can expire during delivery due to the refrigerated and/or frozen items being outside of a temperature-controlled environment for an excessive amount of time. Many embodiments of method 400 solve this problem by determining how long items have been out of a temperature-controlled environment and recalling items during delivery that have been out of a temperature-controlled environment for a period of time that exceeds a delivery compliance time.

Method 400 can comprise an activity 405 of receiving an order from a customer for a delivery of one or more grocery items to a fulfillment location. In many embodiments, the one or more grocery items can comprise a plurality of grocery items. The grocery items can comprise grocery items from one or more group of items: (1) ambient temperature items that do not require a temperature-controlled environment during storage and/or transport; (2) refrigerated items that require typical refrigeration temperatures known in the art during storage and/or transport; and/or (3) frozen items that require typical freezer temperatures known in the art during storage and/or transport.

In some embodiments, activity 405 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

In many embodiments, the fulfillment location can comprise a delivery location requested by the customer. The delivery location can, for example, comprise a home address, a business address, a public place, and so on. In some embodiments, the fulfillment location can comprise the location where a pickup is directed to deliver the one or more grocery items of the order. As shall be described in greater detail below, the fulfillment location can change during delivery of the order based on various circumstances.

After receiving the order, method 400 can optionally comprise additional activities. For example, in some embodiments, method 400 can comprise an activity of determining at least one item of the one or more grocery items of the order comprises a refrigerated item or a frozen item. More particularly, each of the one or more grocery items can be designated in system 300 as an ambient temperature item, a refrigerated item, or a frozen item. System 300, therefore, can determine if any items in the order are either refrigerated items or frozen items. If any of the items in the order are either refrigerated items or frozen items, method 400 can optionally comprise an activity of adding the order to a compliance list. The compliance list can comprise one or more orders that each comprise at least one refrigerated item or at least one frozen item.

Method 400 can further comprise an activity 410 of determining a delivery compliance time for at least one item of the one or more grocery items. The at least one item, for example, can comprise one or more items determined to be a refrigerated item and/or a frozen item. If the frozen item or the refrigerated item is outside of a temperature-controlled environment for a period of time that is greater than the delivery compliance time for the frozen item or the refrigerated item, respectively, then the frozen item or the refrigerated item expires. For example, if ice cream has a delivery compliance time of 15 minutes, then ice cream cannot be out of a temperature-controlled environment for more than 15 minutes or the ice cream expires and is not suitable for delivery to the customer. The temperature-controlled environment can comprise a refrigerator for a refrigerated item, a freezer for a frozen item, or any other atmosphere or temperature-controlled environment known in the art. As used herein, the temperature-controlled environment excludes the ambient temperature of the store, warehouse, fulfillment center, delivery vehicle, and so one. In some embodiments, however, the delivery compliance time for an item can be extended if the item is placed in a cooler, dry ice, etc., for delivery.

In some embodiments, the delivery compliance time for an item can be based on or substantially equal to a logistic suppliance guideline for the item. For example, a frozen item of ice cream can comprise a logistic suppliance guideline recommending that the ice cream not be out of a freezer for more than 15 minutes. The delivery compliance time for the ice cream, then, can comprise 15 minutes in some embodiments. In some embodiments, however, the delivery compliance time includes a buffer time. The buffer time can be added to or subtracted from the logistic suppliance guideline to allow time for (1) transporting the one or more grocery items from the store to a vehicle of the pickup and/or (2) loading the one or more grocery items into the vehicle. In some embodiments, the delivery compliance time for an item can be less than the logistic suppliance guideline for the item. For example, the delivery compliance time for the ice cream can comprise 10 minutes, with a 5 minute buffer time in addition to the delivery compliance time.

In some embodiments, the delivery compliance time also can be influenced by one or more external factors. More particularly, the delivery compliance time for each item can based on one or more of (1) a calendar day of a year and/or (2) outside weather conditions within a predetermined distance to the store. The outside weather conditions can comprise a temperature, humidity, sun exposure, wind chill, heat index, and so on. Thus, in some embodiments, each item can comprise a base delivery compliance time which is adjusted depending on (1) the calendar day of a year and/or (2) the outside temperature within a predetermined distance to the store. For example, if the ice cream has a base delivery compliance time of 15 minutes and the temperature outside the store is 100 degrees Fahrenheit, the delivery compliance time can comprise 10 minutes. If, however, the ice cream has a base delivery compliance time of 15 minutes and the temperature outside the store is 10 degrees Fahrenheit, the delivery compliance time can comprise 20 minutes. Thus, a delivery compliance time for an item can increase or decrease depending on outside weather conditions and/or a calendar day of the year.

As noted above, many orders can comprise a plurality of items. Among these plurality of items can be items with varying delivery compliance times. For example, one order can comprise ice cream with a compliance time of 15 minutes, and also cheese with a compliance time of 30 minutes. Because the delivery compliance times for items in a single order can vary, in some embodiments, activity 410 can comprise determining, for each item of the one or more grocery items, its own delivery compliance time.

More particularly, in some embodiments, activity 410 can comprise determining that the plurality of grocery items comprises at least two temperature-controlled items. The at least two temperature-controlled items can comprise any combination of refrigerated and/or frozen items. When system 300 (FIG. 3) determines that the plurality of grocery items comprises at least two-temperature controlled items, method 400 can optionally further comprise activities of (1) determining a first delivery compliance time for a first temperature-controlled item of the at least two temperature-controlled items, and (2) determining a second delivery compliance time for a second temperature-controlled item of the at least two temperature-controlled items. When the first delivery compliance time and the second delivery compliance time are determined, the first delivery compliance time and the second delivery compliance time can be compared to determine a composite delivery compliance time for the order. Thus, in some embodiments, method 400 can optionally further comprise an activity of determining a composite delivery compliance time for the order. The composite delivery compliance time can, in some embodiments, comprise a lesser of the first compliance delivery time and the second compliance delivery time. For example, one order can comprise ice cream with a compliance time of 15 minutes, and also cheese with a compliance time of 30 minutes. Because the smallest delivery compliance time of the two items is 15 minutes, the composite delivery compliance time can comprise 15 minutes rather than 30 minutes.

Continuing in FIG. 4, method 400 can further comprise an activity 415 of receiving a pickup notification indicating that the at least one item of the one or more grocery items has been removed from the temperature-controlled environment at the store at a first time for a pickup to pick up the one or more grocery items from the store and deliver the one or more grocery items to the delivery location requested by the customer. In some embodiments, the entire order can be stored in a separate temperature-controlled environment for collected orders. In other embodiments, only that least one item requiring a temperature-controlled environment can be stored in the separate temperature-controlled environment for collected orders. Thus, in many embodiments, at least one item is collected from a first temperature-controlled environment at the store as part of the collection process, and then stored in a second, separate temperature-controlled environment at the store. More particularly, in these embodiments, the first temperature-controlled environment at the store can be a portion of the store where products are regularly stored for customer and/or employee collection (such as a freezer isle in the store), while the second temperature-controlled environment at the store can be a separate temperature-controlled environment for only collected orders. In still other embodiments, the temperature-controlled environment can refer to the portion of the store where products are regularly stored for customer and/or employee collection, and a second temperature-controlled environment for collected orders is unnecessary. In any event, according to different embodiments, the first time can begin when (1) the at least one item is removed from the temperature-controlled environment for collected orders, (2) the at least one item is removed from the original temperature-controlled environment at the store holding the at least one item before the at least one item is collected for the order, or (3) when the pickup receives the at least one item for delivery of the order to the delivery location.

The pickup can be a customer or delivery service employee walking to the store, or riding a bike to the store. The pickup also can be a customer or delivery service employee taking a bus, a subway, bicycle, or a train to the store. The pickup further can be a customer or delivery service employee driving a car, or taking a taxi, rideshare, and/or other transportation method to the store. The pickup also can be a customer or delivery service authorizing an autonomous vehicle, drone, etc. to travel to the store. The pickup electronic device can comprise a mobile electronic device like a watch, a phone, a tablet computer electronic device, and the like. In some embodiments, the pickup electronic device can comprise an electronic device built into the vehicle of the customer or the delivery vehicle picking up the order.

Method 400 can further comprise an activity 420 of determining, at a second time after the first time, if a duration of time between the first time and the second time is greater than the delivery compliance time for the at least one item of the one or more grocery items. By way of a non-limiting example, the pickup notification can indicate that an order comprising ice cream (with a delivery compliance time of 15 minutes) was picked up at the store at a first time of 4 PM. System 300 (FIG. 3) can then determine at a second time of 4:10 PM that the duration of time between the first time and the second time is not greater than the delivery compliance time for the ice cream, and thus delivery of the ice cream to the customer can continue to proceed. Alternatively or additionally, system 300 (FIG. 3) can then determine at a second time of 4:20 PM that the duration of time between the first time and the second time is greater than the delivery compliance time for the ice cream, and thus the ice cream has expired and must be re-called before delivery.

In some embodiments, activity 420 can comprise repeatedly determining, at a plurality of second times after the first time until an electronic signature is received from the customer, if the duration of time between the first time and each second time of the plurality of second times is greater than any of the delivery compliance times for the at least one item of the one or more grocery items. For example, system 300 (FIG. 3) can determine every 15 seconds, 30 seconds, 60 seconds, 90 seconds, two minutes, three minutes, and so on, if the duration of time between the present, second time and the first time when the order was picked up exceeds the compliance time for a grocery item in the order. In embodiments comprising a plurality of grocery items, activity 420 can comprise determining, at the second time after the first time, if the duration of time between the first time and the second time is greater than the composite delivery compliance time, as described above.

If the duration of time between the first time and the second time is determined to be greater than the delivery compliance time for at least one item of the one or more grocery items in the order, one or more additional activities can be performed in response to this determination. For example, method 400 can further comprise an activity 425 of, if the duration of time between the first time and the second time is greater than the delivery compliance time for at least one item of the one or more grocery items, coordinating displaying an expiration message on a pickup interface of a pickup electronic device of the pickup. Additionally or alternatively, method 400 can optionally comprise an activity of generating instructions for providing a pickup interface on the pickup electronic device that displays the expiration message.

The expiration message can, in some embodiments, inform the pickup that one or more items in the order have expired because a delivery compliance time has been exceeded. Moreover, the expiration message can alternatively or additionally indicate which item(s) of the order have expired. In some embodiments, the expiration message can change the fulfillment location for the order from the delivery location requested by the customer to a return location designated by the store. This change can, in some embodiments, be visible to the pickup and not the customer. Additionally or alternatively, this change also can be only a temporary change. That is, the fulfillment location is temporarily changed to the return location until the pickup picks up a replacement item for the expired item, at which point the fulfillment location reverts back to the delivery location. In some embodiments, the return location can comprise the store from which the order was picked up. In other embodiments, the return location can comprise a different store, warehouse, etc., that is closer to the location of the pickup.

In some optional embodiments, a customer can be informed if the pickup has been re-routed and/or one or more items have expired. For example, method 400 can optionally comprise an activity of, if the duration of time between the first time and the second time is greater than the delivery compliance time for at least one item of one or more grocery items in an order, coordinating displaying an update message on a customer interface of the customer electronic device. Additionally or alternatively, method 400 can optionally comprise an activity of generating instructions for providing a customer interface on the customer electronic device that displays the update message. The update message can indicate that the pickup has been re-routed to the store and/or that at least one item has expired because delivery had exceeded the compliance time for the at least one item.

Moreover, in some embodiments, method 400 can optionally comprise an activity of, if the duration of time between the first time and the second time is greater than the delivery compliance time for at least one item of one or more grocery items in an order, coordinating displaying on a store interface of a store electronic device a pickup return notification. Additionally or alternatively, method 400 can optionally comprise an activity of generating instructions for providing a store interface on a store electronic device that displays the pickup return notification. The pickup return notification can indicate that the pickup is returning to the store due to an expiration of the delivery compliance time for at least one item before the delivery of the order. This can allow the store to select a new item to replace the expired item in anticipation of the pickup returning to the store.

In some embodiments where the at least one item is re-called, the pickup can deliver the remainder of the one or more grocery items to the delivery location requested by the customer before the pickup travels to the return location, Additionally or alternatively, at the delivery location, the customer or other recipient of the remainder of the one or more grocery items can decide whether to receive the at least one item that has been re-called and, if so, the customer or recipient can receive a discount for the at least one item that has been re-called.

One or more embodiments of method 400 can optionally comprise activities related to a specific location of the pickup as tracked by system 300 (FIG. 3). For example, method 400 can optionally comprise an activity of tracking a pickup location of the pickup after the pickup has left the store with the order to deliver the order to the customer. More particularly, when the pickup picks up the order from the store, the pickup electronic device of the pickup can display a prompt inquiring whether or not the interface has permission to use the current location of the pickup electronic device. More particularly, the system 300 (FIG. 3) can seek permission or authorization from the pickup to activate an internal global positioning system (GPS) unit of the pickup electronic device to identify the current location of the pickup electronic device. With permission, the pickup electronic device can obtain and transmit signals to system 300 (FIG. 3), including tracking information with the current location of the pickup electronic device. In some embodiments, the authorization is not required for system 300 (FIG. 3) to track the pickup electronic device, and the internal GPS of the pickup electronic device can be activated automatically when the pickup picks up the order from the store or even before the pickup picks up the order from the store.

When a location of the pickup electronic device is being tracked, method 400 can optionally comprise an activity of repeatedly determining an estimated remaining travel time between the pickup location as tracked and the delivery location. For example, system 300 can determine a first estimated travel time between a first pickup location of the pickup and the delivery location during delivery of the order, and also at least a second estimated travel time between a second pickup location of the pickup (different from the first pickup location) and the delivery location while of the order is in transit to the delivery location.

After an estimated travel time is determined, method 400 can optionally comprise an activity of determining if the estimated travel time exceeds a remaining time in the delivery compliance time of at least one item in the order. More particularly, in some embodiments, method 400 can optionally comprise an activity of determining if the estimated travel time exceeds, by a predetermined margin, a remaining time in the delivery compliance time of at least one item in the order. The predetermined margin can comprise periods of time, such as but not limited to 1 minute, 2 minutes, 3 minutes, 4 minutes, 5 minutes, and so on. In a different embodiment, the delivery compliance time has a built-in margin, so as not use an additional predetermined margin during delivery.

In some embodiments, if the estimated travel time exceeds the remaining time in the delivery compliance time of at least one item by the predetermined margin, method 400 can optionally comprise an activity of coordinating displaying an expected expiration message on the pickup interface of the pickup electronic device of the pickup. Additionally or alternatively, method 400 can optionally comprise an activity of generating instructions for providing the pickup interface on the pickup electronic device that displays the expected expiration message. The expected expiration message can, in some embodiments, change the fulfillment location for the order from the delivery location requested by the customer to a return location designated by the store. The return location can be the store from which the order was picked up by the pickup or, alternatively, can be a different store, warehouse, etc., closer to the current location of the pickup.

Optional embodiments of method 400 can require a signature of a customer when the order is delivered to the customer. In some embodiments, the signature can indicate that the order was received within the delivery compliance time of each of the items in the order. Thus, method 400 can optionally comprise an activity of receiving an electronic signature from the customer indicating the order has been delivered to the customer within the delivery compliance time of the at least one item. In some embodiments, the electronic signature can be received from the pickup electronic device, where the customer has electronically signed for the order. Once the electronic signature has been received, method 400 can optionally comprise an activity of removing the order from the compliance list after receiving the electronic signature from the customer.

FIG. 5 illustrates a block diagram of a portion of system 300 comprising order system 310, web server 320, and display system 360, according to the embodiment shown in FIG. 3. Each of order system 310, web server 320, and display system 360 is merely exemplary and not limited to the embodiments presented herein. Each of order system 310, web server 320, and display system 360 can be employed in many different embodiments or examples not specifically depicted or described herein. In some embodiments, certain elements or modules of order system 310, web server 320, and display system 360 can perform various procedures, processes, and/or acts. In other embodiments, the procedures, processes, and/or acts can be performed by other suitable elements or modules.

In many embodiments, order system 310 can comprise non-transitory memory storage module 512. Memory storage module 512 can be referred to as order module 512. In many embodiments, order module 512 can store computing instructions configured to run on one or more processing modules and perform one or more acts of method 400 (FIG. 4) (e.g., activity 405 of receiving an order from a customer for a delivery of one or more grocery items to a fulfillment location (FIG. 4), activity 415 of receiving a pickup notification indicating that a pickup has picked up the one or more grocery items from a store at a first time (FIG. 4), an activity of tracking a pickup location of the pickup after the pickup has left the store with the order to deliver the order to the customer, and an activity of repeatedly determining an estimated travel time between the pickup location as tracked and the delivery location).

In many embodiments, order system 310 also can comprise non-transitory memory storage module 514. Memory storage module 514 can be referred to as compliance module 514. In many embodiments, compliance module 514 can store computing instructions configured to run on one or more processing modules and perform one or more acts of method 400 (FIG. 4) (e.g., an activity of determining the at least one item of the one or more grocery items of the order comprises a refrigerated item or a frozen item, activity 410 of determining a delivery compliance time for at least one item of the one or more grocery items (FIG. 4), an activity of adding the order to a compliance list, activity 420 of determining, at a second time after the first time, if a duration of time between the first time and the second time is greater than the delivery compliance time for the at least one item of the one or more grocery items (FIG. 4), an activity of receiving an electronic signature from the customer indicating the order has been delivered to the customer within the delivery compliance time of the at least one item, an activity of removing the order from the compliance list after receiving the electronic signature from the customer, and an activity of determining if an estimated travel time exceeds a remaining time in the delivery compliance time of the at least one item by a predetermined margin).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 425 of, if the duration of time between the first time and the second time is greater than the delivery compliance time for the at least one item of the one or more grocery items, coordinating displaying an expiration message on a pickup interface of a pickup electronic device of the pickup (FIG. 4); an activity of, if the duration of time between the first time and the second time is greater than the delivery compliance time for the at least one item of the one or more grocery items, coordinating displaying an update message on a customer interface of the customer electronic device; an activity of, if the duration of time between the first time and the second time is greater than the delivery compliance time for the at least one item of the one or more grocery items, coordinating displaying on a store interface of a store electronic device a pickup return notification indicating that the pickup is returning to the store due to an expiration of the delivery compliance time for the at least one item before the delivery of the order; and an activity of, if the estimated travel time exceeds the remaining time in the delivery compliance time of the at least one item by the predetermined margin, coordinating displaying an expected expiration message on the pickup interface of the pickup electronic device of the pickup).

Although systems and methods for monitoring delivery compliance times of online orders have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory storage devices storing computing instructions configured to run on the one or more processors and perform:
receiving, at the one or more processors, an order (1) from a customer electronic device of a customer and (2) for a delivery of one or more grocery items to a fulfillment location, the fulfillment location initially comprising a delivery location requested by the customer;
determining, using the one or more processors, a delivery compliance time for at least one item of the one or more grocery items, wherein when the at least one item is outside of a temperature-controlled environment for a period of time that is greater than the delivery compliance time for the at least one item, then the at least one item expires;
transmitting, from a facility electronic device of a facility to an autonomous drone pickup system, a pickup notification:
(1) indicating that the at least one item of the one or more grocery items has been removed from the temperature-controlled environment at the facility at a first time; and
(2) activating an autonomous drone for:
(a) pick-up of the one or more grocery items from the facility; and
(b) autonomous delivery of the one or more grocery items to the delivery location requested by the customer;
repeatedly determining, at a predetermined time interval and using the one or more processors and at one or more second times after the first time, when a duration of time between the first time and the one or more second times is greater than the delivery compliance time for the at least one item of the one or more grocery items; and when the duration of time between the first time and the one or more second times is greater than the delivery compliance time for the at least one item of the one or more grocery items:

transmitting, to the autonomous drone pickup system, a rerouting message that changes the fulfillment location from the delivery location requested by the customer to a return location designated by the facility; and causing, using the one or more processors, the customer electronic device of the customer to display an update message indicating that:

the at least one item of the one or more grocery items has expired; and the autonomous drone is returning to the return location designated by the facility due to an expiration of the at least one item of the one or more grocery items.

2. The system of claim 1, wherein the delivery compliance time for the at least one item of the one or more grocery items is based on one or more of (1) a calendar day of a year or (2) an outside temperature within a predetermined distance to the facility.

3. The system of claim 1, wherein:

the one or more non-transitory storage devices storing the computing instructions are further configured to run on the one or more processors and perform:

determining when the at least one item of the one or more grocery items of the order comprises a refrigerated item or a frozen item;

when the at least one item of the one or more grocery items is the refrigerated item or the frozen item, adding the order to a compliance list, the compliance list comprising a plurality of orders comprising at least one refrigerated item or at least one frozen item;

receiving an electronic signature from the customer electronic device of the customer indicating the order has been delivered to the customer within the delivery compliance time of the at least one item; and removing the order from the compliance list after receiving the electronic signature from the customer electronic device of the customer;

determining the delivery compliance time comprises:

when the at least one item of the one or more grocery items comprises the refrigerated item or the frozen item, determining, for each respective item of the at least one item of the one or more grocery items, a respective delivery compliance time; and repeatedly determining, at the predetermined time interval and at the one or more second times after the first time, when the duration of time between the first time and the one or more second times is greater than the delivery compliance time for the at least one item of the one or more grocery items continues until the electronic signature is received from the customer electronic device.

4. The system of claim 1, wherein:

the one or more grocery items of the order comprise a plurality of grocery items;

the one or more non-transitory storage devices storing the computing instructions are further configured to run on the one or more processors and perform:

determining that the plurality of grocery items comprise at least two temperature-controlled items;

determining the delivery compliance time for the at least one item of the one or more grocery items comprises:

determining a first delivery compliance time for a first temperature-controlled item of the at least two temperature-controlled items;

determining a second delivery compliance time for a second temperature-controlled item of the at least two temperature-controlled items; and determining a composite delivery compliance time, the composite delivery compliance time comprising a lesser of the first delivery compliance time and the second delivery compliance time;

transmitting the pickup notification comprises:

transmitting the pickup notification indicating that the at least two temperature-controlled items have been removed from the temperature-controlled environment at the first time;

repeatedly determining, at the predetermined time interval, when the duration of time between the first time and the one or more second times is greater than the delivery compliance time for the at least one item of the one or more grocery items comprises:

repeatedly determining, at the predetermined time interval and at the one or more second times after the first time, when the duration of time between the first time and the one or more second times is greater than the composite delivery compliance time; and transmitting the rerouting message comprises:

when the duration of time between the first time and the one or more second times is greater than the composite delivery compliance time, transmitting, to the autonomous drone pickup system, the rerouting message that changes the fulfillment location from the delivery location requested by the customer to the return location designated by the facility.

5. The system of claim 1, wherein the delivery compliance time includes a buffer time for (1) transporting the one or more grocery items from the facility to the autonomous drone of the autonomous drone pickup system and (2) loading the one or more grocery items into the autonomous drone of the autonomous drone pickup system.

6. The system of claim 1, wherein the one or more non-transitory storage devices storing the computing instructions are further configured to run on the one or more processors and perform:

when the duration of time between the first time and the one or more second times is greater than the delivery compliance time for the at least one item of the one or more grocery items, coordinating displaying, on a facility interface of the facility electronic device of the facility, a pickup return notification indicating that the autonomous drone is returning to the return location designated by the facility due to an expiration of the delivery compliance time for the at least one item before the delivery of the order.

7. The system of claim 1, wherein:

the one or more non-transitory storage devices storing the computing instructions are further configured to run on the one or more processors and perform:

tracking a pickup location of the autonomous drone after the autonomous drone has left the facility with the order to deliver the order to the customer;

repeatedly determining when the duration of time between the first time and the one or more second times is greater than the delivery compliance time comprises:

repeatedly determining a remaining estimated travel time between the pickup location, as tracked, and the delivery location requested by the customer; and determining when the remaining estimated travel time exceeds a remaining time in the delivery compliance time of the at least one item by a predetermined margin; and transmitting the rerouting message comprises:

when the remaining estimated travel time exceeds the remaining time in the delivery compliance time of the at least one item by the predetermined margin, transmitting, to the autonomous drone pickup system, the rerouting message that changes the fulfillment location for the order from the delivery location requested by the customer to the return location designated by the facility.

8. A method being implemented via execution of computing instructions configured to run at one or more processors and configured to be stored at one or more non-transitory computer-readable media, the method comprising:

receiving, at the one or more processors, an order (1) from a customer electronic device of a customer and (2) for a delivery of one or more grocery items to a fulfillment location, the fulfillment location initially comprising a delivery location requested by the customer;

determining, using the one or more processors, a delivery compliance time for at least one item of the one or more grocery items, wherein when the at least one item is outside of a temperature-controlled environment for a period of time that is greater than the delivery compliance time for the at least one item, then the at least one item expires;

transmitting, from a facility electronic device of a facility to an autonomous drone pickup system, a pickup notification:

(1) indicating that the at least one item of the one or more grocery items has been removed from the temperature-controlled environment at the facility at a first time; and (2) activating an autonomous drone for:

(a) pick-up of the one or more grocery items from the facility; and (b) autonomous delivery of the one or more grocery items to the delivery location requested by the customer;

repeatedly determining, at a predetermined time interval and using the one or more processors and at one or more second times after the first time, when a duration of time between the first time and the one or more second times is greater than the delivery compliance time for the at least one item of the one or more grocery items; and when the duration of time between the first time and the one or more second times is greater than the delivery compliance time for the at least one item of the one or more grocery items:

transmitting, to the autonomous drone pickup system, a rerouting message that changes the fulfillment location from the delivery location requested by the customer to a return location designated by the facility; and causing, using the one or more processors, the customer electronic device of the customer to display an update message indicating that:

the at least one item of the one or more grocery items has expired; and the autonomous drone is returning to the return location designated by the facility due to an expiration of the at least one item of the one or more grocery items.

9. The method of claim 8, wherein the delivery compliance time for the at least one item of the one or more grocery items is based on one or more of (1) a calendar day of a year or (2) an outside temperature within a predetermined distance to the facility.

10. The method of claim 8, wherein:

the method further comprises:

determining when the at least one item of the one or more grocery items of the order comprises a refrigerated item or a frozen item;

when the at least one item of the one or more grocery items is the refrigerated item or the frozen item, adding the order to a compliance list, the compliance list comprising a plurality of orders comprising at least one refrigerated item or at least one frozen item;

receiving an electronic signature from the customer electronic device of the customer indicating the order has been delivered to the customer within the delivery compliance time of the at least one item; and removing the order from the compliance list after receiving the electronic signature from the customer electronic device of the customer;

determining the delivery compliance time comprises:

when the at least one item of the one or more grocery items comprises the refrigerated item or the frozen item, determining, for each respective item of the at least one item of the one or more grocery items, a respective delivery compliance time; and repeatedly determining, at the predetermined time interval and at the one or more second times after the first time, when the duration of time between the first time and the one or more second times is greater than the delivery compliance time for the at least one item of the one or more grocery items continues until the electronic signature is received from the customer electronic device.

11. The method of claim 8, wherein:

the one or more grocery items of the order comprise a plurality of grocery items;

the method further comprises determining that the plurality of grocery items comprise at least two temperature-controlled items;

determining the delivery compliance time for the at least one item of the one or more grocery items comprises:

determining a first delivery compliance time for a first temperature-controlled item of the at least two temperature-controlled items;

determining a second delivery compliance time for a second temperature-controlled item of the at least two temperature-controlled items; and determining a composite delivery compliance time, the composite delivery compliance time comprising a lesser of the first delivery compliance time and the second delivery compliance time;

transmitting the pickup notification comprises:

transmitting the pickup notification indicating that the at least two temperature-controlled items have been removed from the temperature-controlled environment at the first time;

repeatedly determining, at the predetermined time interval, when the duration of time between the first time and the one or more second times is greater than the delivery compliance time for the at least one item of the one or more grocery items comprises:
repeatedly determining, at the predetermined time interval and at the one or more second times after the first time, when the duration of time between the first time and the one or more second times is greater than the composite delivery compliance time; and
transmitting the rerouting message comprises:
when the duration of time between the first time and the one or more second times is greater than the composite delivery compliance time, transmitting, to the autonomous drone pickup system, the rerouting message that changes the fulfillment location from the delivery location requested by the customer to the return location designated by the facility.

12. The method of claim 8, wherein the delivery compliance time includes a buffer time for (1) transporting the one or more grocery items from the facility to the autonomous drone of the autonomous drone pickup system and (2) loading the one or more grocery items into the autonomous drone of the autonomous drone pickup system.

13. The method of claim 8, further comprising:
when the duration of time between the first time and the one or more second times is greater than the delivery compliance time for the at least one item of the one or more grocery items, coordinating displaying, on a facility interface of the facility electronic device of the facility, a pickup return notification indicating that the autonomous drone is returning to the return location designated by the facility due to an expiration of the delivery compliance time for the at least one item before the delivery of the order.

14. The method of claim 8, wherein:
the method further comprises:
tracking a pickup location of the autonomous drone after the autonomous drone has left the facility with the order to deliver the order to the customer;
repeatedly determining when the duration of time between the first time and the one or more second times is greater than the delivery compliance time comprises:
repeatedly determining a remaining estimated travel time between the pickup location, as tracked, and the delivery location requested by the customer; and
determining when the remaining estimated travel time exceeds a remaining time in the delivery compliance time of the at least one item by a predetermined margin; and
transmitting the rerouting message comprises:
when the remaining estimated travel time exceeds the remaining time in the delivery compliance time of the at least one item by the predetermined margin, transmitting, to the autonomous drone pickup system, the rerouting message that changes the fulfillment location for the order from the delivery location requested by the customer to the return location designated by the facility.

15. The system of claim 1, wherein the one or more non-transitory storage devices storing the computing instructions are further configured to run on the one or more processors and perform:
prior to transmitting the rerouting message, facilitating delivery, by the autonomous drone, of one or more non-expired items of the order to the fulfillment location;
in response to delivering the one or more non-expired items, causing the customer electronic device of the customer to display an expired item acceptance prompt; and
receiving a rejection from the customer electronic device of the customer of the expired item acceptance prompt.

16. The system of claim 7, wherein the one or more non-transitory storage devices storing the computing instructions are further configured to run on the one or more processors and perform:
prior to tracking the pickup location of the autonomous drone, requesting permission from the autonomous drone pickup system to track the autonomous drone.

17. The system of claim 1, wherein the delivery compliance time is determined using outside weather conditions within a predetermined distance to the facility, the outside weather conditions comprising one or more of:
a temperature of the outside weather conditions;
a humidity of the outside weather conditions;
a wind chill of the outside weather conditions; or
a heat index of the outside weather conditions.

18. The method of claim 8 further comprising:
prior to transmitting the rerouting message, facilitating delivery, by the autonomous drone, of one or more non-expired items of the order to the fulfillment location;
in response to delivering the one or more non-expired items, causing the customer electronic device of the customer to display an expired item acceptance prompt; and
receiving a rejection from the customer electronic device of the customer of the expired item acceptance prompt.

19. The method of claim 14, further comprising:
prior to tracking the pickup location of the autonomous drone, requesting permission from the autonomous drone pickup system to track the autonomous drone.

20. The method of claim 8, wherein the delivery compliance time is determined using outside weather conditions within a predetermined distance to the facility, the outside weather conditions comprising one or more of:
a temperature of the outside weather conditions;
a humidity of the outside weather conditions;
a wind chill of the outside weather conditions; or
a heat index of the outside weather conditions.

\* \* \* \* \*